(12) United States Patent
Sato

(10) Patent No.: US 6,947,181 B1
(45) Date of Patent: Sep. 20, 2005

(54) IMAGE TRANSMITTER

(75) Inventor: Tsuneo Sato, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 679 days.

(21) Appl. No.: 09/660,240

(22) Filed: Sep. 12, 2000

(30) Foreign Application Priority Data

Sep. 13, 1999 (JP) ................................ 11-258968

(51) Int. Cl.[7] ............................................. H04N 1/00
(52) U.S. Cl. ...................... 358/400; 358/405; 358/1.15
(58) Field of Search ............................... 358/474, 400, 358/405, 435, 1.15, 1.14

(56) References Cited

U.S. PATENT DOCUMENTS

| | | | | |
|---|---|---|---|---|
| 5,172,243 A | * | 12/1992 | Hayashi et al. | 358/400 |
| 5,532,939 A | * | 7/1996 | Psinakis et al. | 709/226 |
| 6,067,171 A | * | 5/2000 | Yamada et al. | 358/406 |
| 6,567,397 B1 | * | 5/2003 | Campana et al. | 370/349 |
| 2003/0115277 A1 | * | 6/2003 | Wataabe et al. | 709/207 |

FOREIGN PATENT DOCUMENTS

JP            08184752      *   7/1996   ............ G02B 7/28

* cited by examiner

Primary Examiner—Kimberly Williams
Assistant Examiner—Negussie Worku
(74) Attorney, Agent, or Firm—Birch, Stewart, Kolasch & Birch LLP

(57) ABSTRACT

One or more images to be transmitted are selected, and a battery is checked to determine the residual quantity of the battery. According to the data amount of the selected images and the determined residual quantity of the battery, it is determined whether it is possible or not to transmit all of image data. If it is determined that it is impossible to transmit all of the image data, a message indicating the impossibility of the transmission is displayed and the transmission of the image data is prohibited from starting. This eliminates the disadvantage that the transmission of the image data may be interrupted if the battery should go dead during the transmission.

35 Claims, 6 Drawing Sheets

[IMAGE FORMAT]

| HEADER |
|---|
| ANNEXED INFORMATION |
| THUMBNAIL IMAGE DATA |
| MAIN IMAGE DATA |

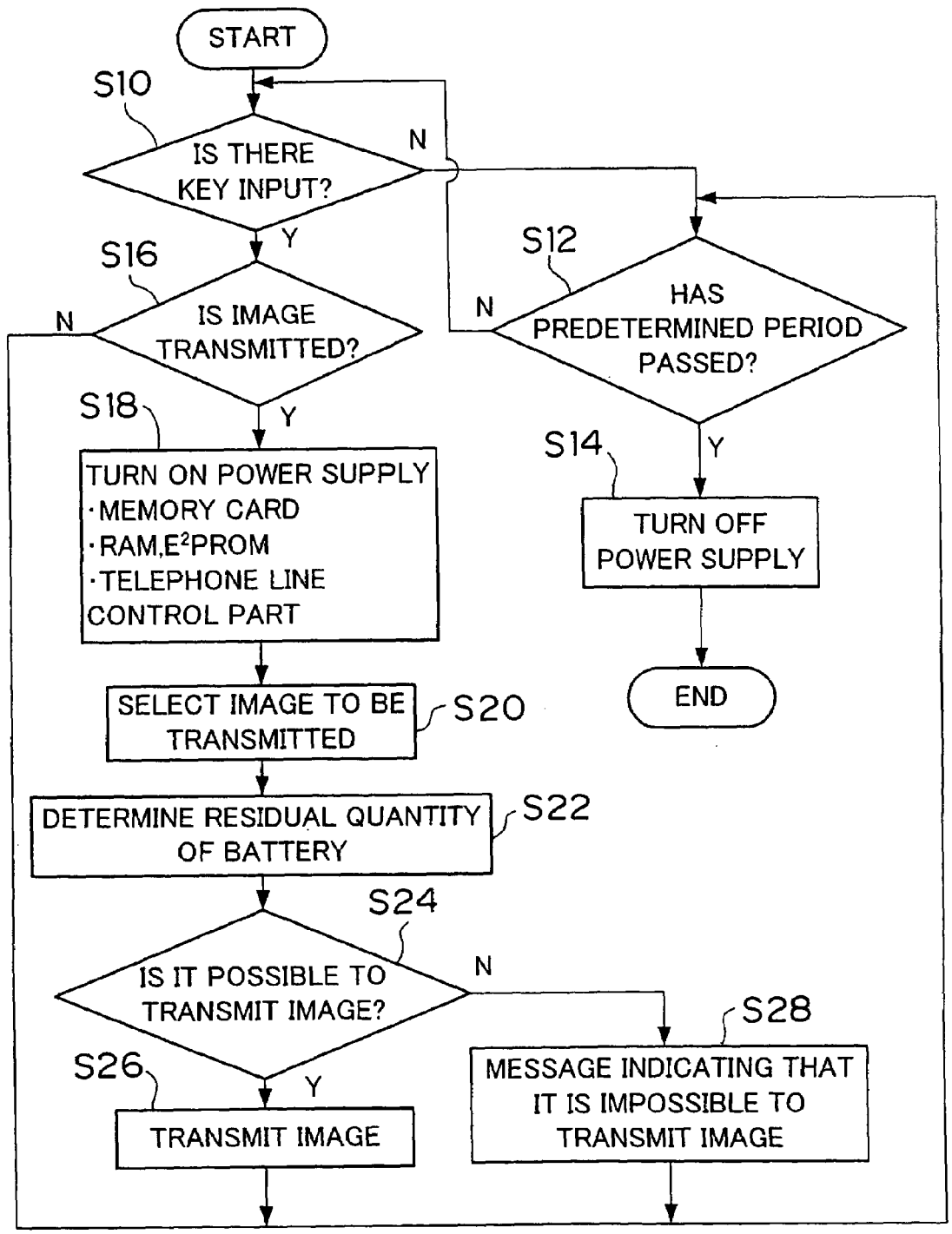
F I G. 4

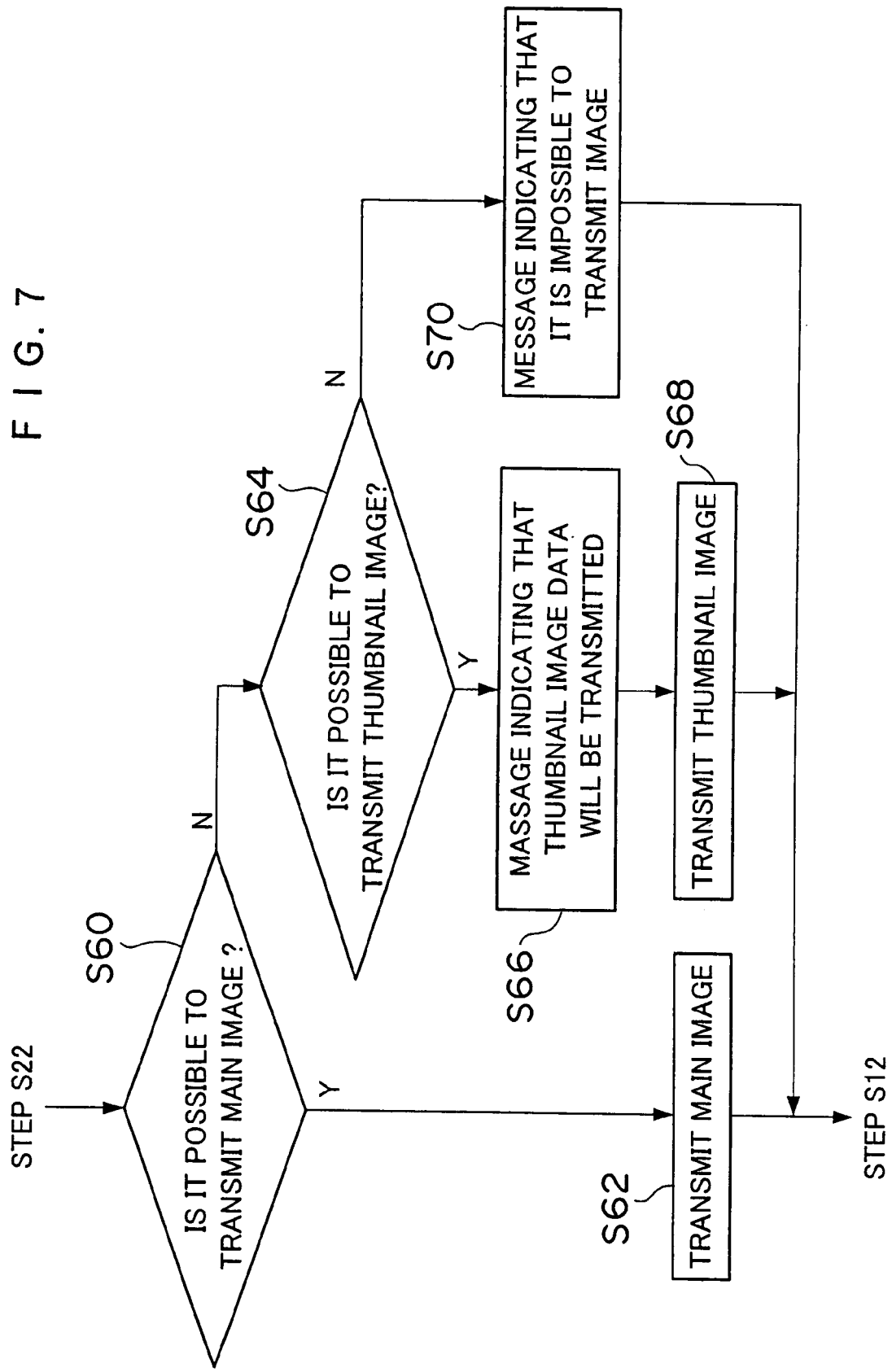

IMAGE TRANSMITTER

BACKGROUND OF THE INVENTION

1. Field of the Invention

The present invention relates generally to an image transmitter, and more particularly to a portable image transmitter powered by a battery.

2. Description of Related Art

There is a conventional image transmission system, wherein: image data acquired by a digital camera or the like is captured into a portable microcomputer (e.g., a laptop, a notebook, and a palmtop) with an image transmitting function; the image data is transmitted from the portable microcomputer through the public telephone network with a portable telephone such as a cellular phone; and a receiving computer or a server receives the transmitted image data through the public telephone network via a modem or an adapter.

Since the image data includes a large amount of data, it takes a long time to transfer the image data with several million pixels if a plurality of pieces of image data are transmitted from the portable microcomputer by using the portable phone and the like. Therefore, when the image data is transmitted from the portable microcomputer by using the portable phone and the like while being powered by a battery, there is a problem that the transmission of the image data is interrupted if the battery goes dead during the transmission of the image data. In particular, if image data of a plurality of images is transmitted at the same time, there is a high probability that the transmission of the image data may be interrupted.

SUMMARY OF THE INVENTION

It is therefore an object of the present invention to provide an image transmitter that prevents the transmission of image data from being interrupted while being powered by a battery.

The above object can be accomplished by providing an image transmitter which transmits image data, the image transmitter comprising: an image selecting device which selects at least one image to be transmitted; a data amount determining device which determines an amount of data in the selected image; a battery residual quantity determining device which determines a residual quantity of a battery powering the image transmitter; a transmittability determining device which determines whether or not it is possible to transmit all of image data of the selected image according to the amount of data in the selected image and the residual quantity of the battery; and a control device which transmits the image data if the transmittability determination device determines that it is possible to transmit all of the image data, and which prohibits the image data from being transmitted if the transmittability determination device determines that it is impossible to transmit all of the image data.

More specifically, if it is determined that it is impossible to transmit all of the image data according to the amount of the image data to be transmitted and the residual quantity of the battery, the transmission of the image data is prohibited from starting. This eliminates the disadvantage that the transmission of the image data is interrupted since the battery goes dead during the transmission.

Preferably, the image transmitter further comprises: a display device which displays a message indicating that it is impossible to transmit all of the image data if the control device prohibits the image data from being transmitted.

Preferably, the image data comprises an identification code; and the image selecting device selects the image to be transmitted according to input of the identification code. Preferably, the identification code comprises at least one of the following: a manufacture identification code representing a manufacturer of an image input device capturing the image, a date identification code representing one of a photographing date and an image file creation date of the image, and a model identification code representing a model of the image input device. These identification codes make it easier to select the related images.

Preferably, when a plurality of images are selected to be transmitted, if it is determined that it is impossible to transmit all of the image data, the control device transmits only transmittable image data per image and prohibits the rest of image data from being transmitted. Therefore, if the plurality of images to be transmitted is selected and not all of the images can be transmitted, it is possible to transmit only transmittable image one by one.

Preferably, the image data comprises main image data and thumbnail image data; if the determination device determines that it is impossible to transmit all of the main image data, the determination device further determines whether it is possible to transmit all of the thumbnail image data; and if the determination device determines that it is impossible to transmit all of the main image data and that it is possible to transmit all of the thumbnail image data, the control device transmits the thumbnail image data instead of the main image data. More specifically, if it is impossible to transmit the main image data but it is possible to transmit the thumbnail image data with the smaller data amount than the main image data, the thumbnail image data is only transmitted.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a flow chart showing a procedure of transmitting images by the image transmitter in FIG. 1;

FIG. 7 is a flow chart showing yet another embodiment of determination about whether or not it is possible to transmit images.

DETAILED DESCRIPTION OF THE PREFERRED EMBODIMENTS

Preferred embodiments of an image transmitter according to the present invention will be described hereinbelow with reference to the accompanying drawings.

Figures 1, 2:
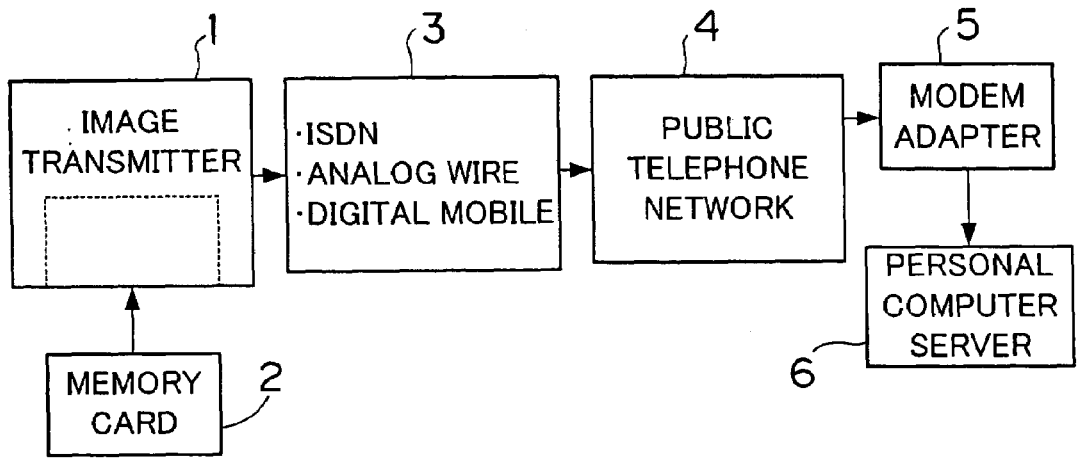
FIG. 1 is a conceptual drawing showing a system in which an image transmitter according to the present invention is used.
FIG. 2 is a view showing an example of formats of images recorded by an image input device.

FIG. 1 is a conceptual drawing of a system in which an image transmitter of the present invention is used.

In FIG. 1, a memory card 2 containing image data is attachable to the image transmitter 1. From the memory card 2, the image transmitter 1 captures image data to be transmitted.

The image data in a predetermined image format is recorded in the memory card 2 by an image input device such as a digital camera (not shown). As shown in FIG. 2, an image file comprises a file header, annexed information, thumbnail image data and main image data. The annexed information includes a variety of information such as the name of the manufacturer of the image input device, the name of the model of the image input device, the file creation date and the amount of data.

Upon image data to be transmitted is selected from the memory card 2 and an instruction to transmit the image data is given, the image transmitter 1 transmits the image data to a personal computer/server 6 via an interface 3 such as a digital wire telephone system (e.g., Integrated Services Digital Network (ISDN)), an analog wire telephone system, a digital mobile telephone system, a public telephone network 4, and a modem/adapter 5.

Figure 3:
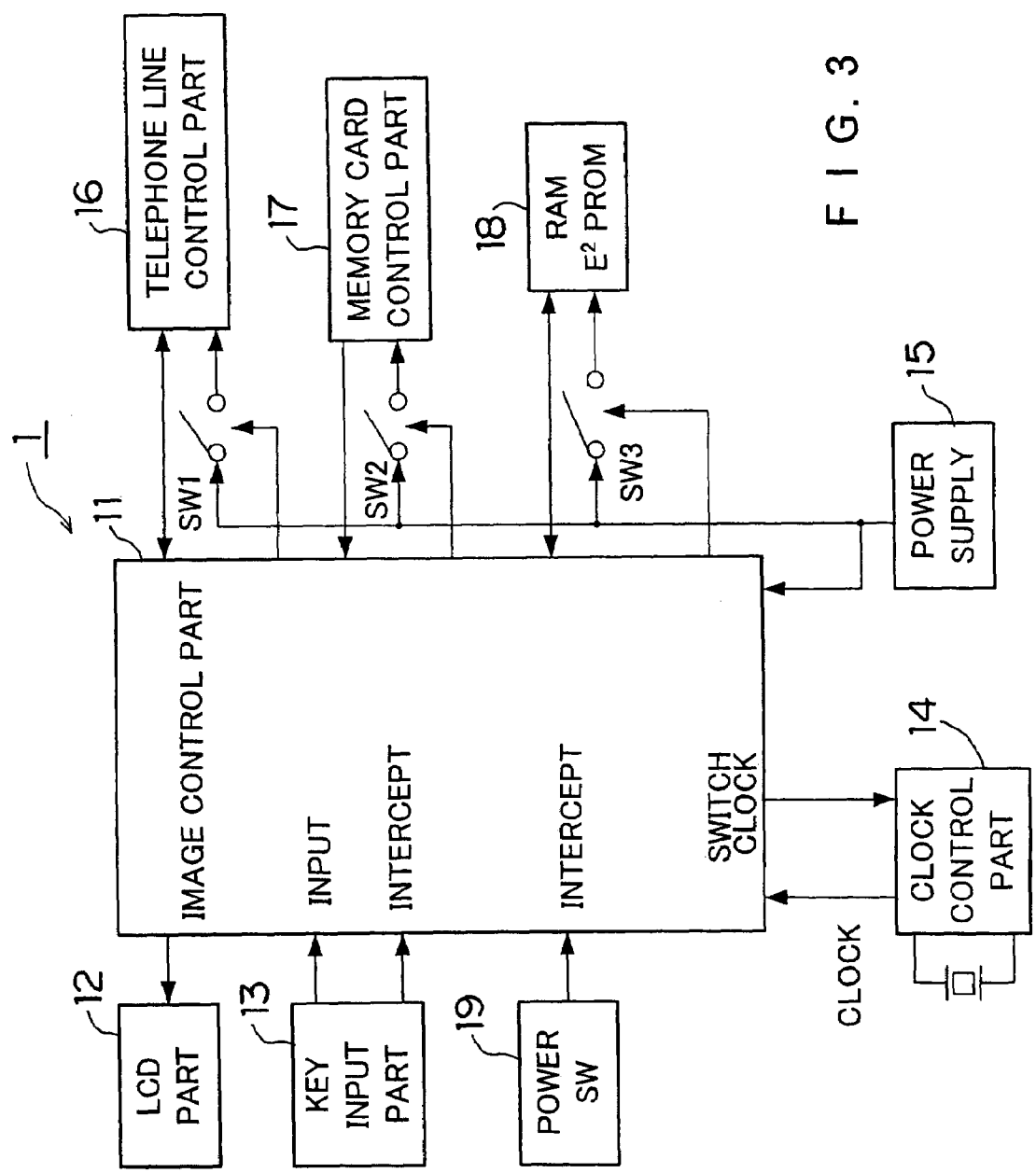
FIG. 3 is an inside block diagram showing an embodiment of the image transmitter in FIG. 1.

FIG. 3 is an inside block diagram of the image transmitter 1 according to a preferred embodiment.

In FIG. 3, the image transmitter 1 includes a small portable microcomputer (e.g., a laptop, a notebook, and a palmtop). The image transmitter 1 comprises an image control part 11; a liquid crystal display (LCD) part 12; a key input part 13; a clock control part 14, a battery power supply 15 including a primary (disposable) battery or a secondary (rechargeable) battery; a telephone line control part 16; a memory card control part 17; and a RAM/EEPROM 18.

The image control part 11 controls the clock control part 14 to oscillate a clock upon the interception of the key input part 13 and a power switch 19, and turns on the LCD part 12. Upon receipt of an instruction from the key input part 13 to transfer the image data, the image control part 11 turns on power supplies of the memory card control part 17 and the RAM/EEPROM 18 by switches SW2 and SW3, and changes the clock to a high-frequency. Then, the image control part 11 reads the image data stored in the memory card 2 through the memory card control part 17, and determines whether the memory card 2 contains any image data to be transmitted. If the image control part 11 determines that there is some image data to be transmitted in the memory card 2, the image control part 11 turns on a power supply of the telephone line control part 16 by a switch SW 1 and then transmits the image data.

Upon completion of the image data transmission, the image control part 11 displays a message indicating the completion of the image transmission on the LCD part 12. Then, the image control part 11 turns off the power supplies of the telephone line control part 16, the memory card control part 17 and the RAM/EEPROM 18 by the switches SW1, SW2 and SW3, and changes the clock to a low frequency to thereby reduce the power consumption. Thereafter, the image control part 11 counts for a predetermined period of time to determine whether there is any new key input from the key input part 13. If there is no key input in the predetermined period of time, the image control part 11 turns off the display of the LCD part 12 and stops the oscillation of the clock to thereby reduce the power consumption to approximately zero.

There will now be described a procedure for controlling the transmission of the image data by the image control part 11. As described hereinbelow, the image control part 11 controls the transmission in such a manner as not to interrupt the transmission of the image data in a case where the image transmitter 1 is powered by the battery.

As shown in the flow chart of FIG. 4, the image control part 11 determines whether there is any key input after the power switch 19 is turned on (step S10). If there is no key input, the image control part 11 counts for a predetermined period of time (step S12). In the case where there is no key input during the predetermined period of time passes, the image control part 11 turns off the power supplies of the LCD part 12 and the like as described previously (step S14).

If there is a key input at the step S10, the image control part 11 determines whether the key input is an instruction to transmit the image data or not (step S16). If the key input is not the instruction to transmit the image data, the process jumps to the step S12. If the key input is the instruction to transmit the image data, the process goes to a step S18.

In the step S18, the image control part 11 turns on the power supplies of the telephone line control part 16, the memory card control part 17 and the RAM/EEPROM 18 by the switches SW1–SW3 as stated previously. Then, the image control part 11 reads the image data stored in the memory card 2, and displays a multi-image composed of multiple images read from the memory card 2 on the LCD part 12 to select one or more images to be transmitted in an onscreen interactive mode (step S20).

Then, the image control part 11 checks the battery to determine the residual quantity of the battery (i.e., the electric energy drawable from the battery) (step S22). According to the residual quantity determined in the step S22, the image control part 11 determines whether it is possible or not to transmit all the images selected in the step S20 (step S24) in a manner described below. The image control part 11 reads, from the annexed information of the image file, the amount of data about the image to be transmitted. If there is a plurality of images to be transmitted, the image control part 11 finds the total amount of data about the images to be transmitted. Then, the image control part calculates a transmission period required for transmitting the found amount of data. On the other hand, the image control part 11 finds a transmittable period according to the residual quantity of the battery determined in the step S22. If the transmittable period found according to the residual quantity of the battery is longer than the transmission period required for the transmission of the total data, the image control part 11 determines that it is possible to transmit all the selected images.

If it is determined in the step S24 that it is possible to transmit all the selected images, the image control part 11 transmits the image data about the images selected in the step S20 (step S26). Then, the process jumps to the step S12.

On the other hand, if it is determined in the step S24 that it is impossible to transmit all the selected images, the image control part 11 displays a message indicating the impossibility of the image transmission on the LCD part 12 and prohibits the transmission of the image data (step S28). Then, the process jumps to the step S12. This eliminates the disadvantage that the transmission of the image data is interrupted if the battery should go dead during the transmission.

Figure 5:
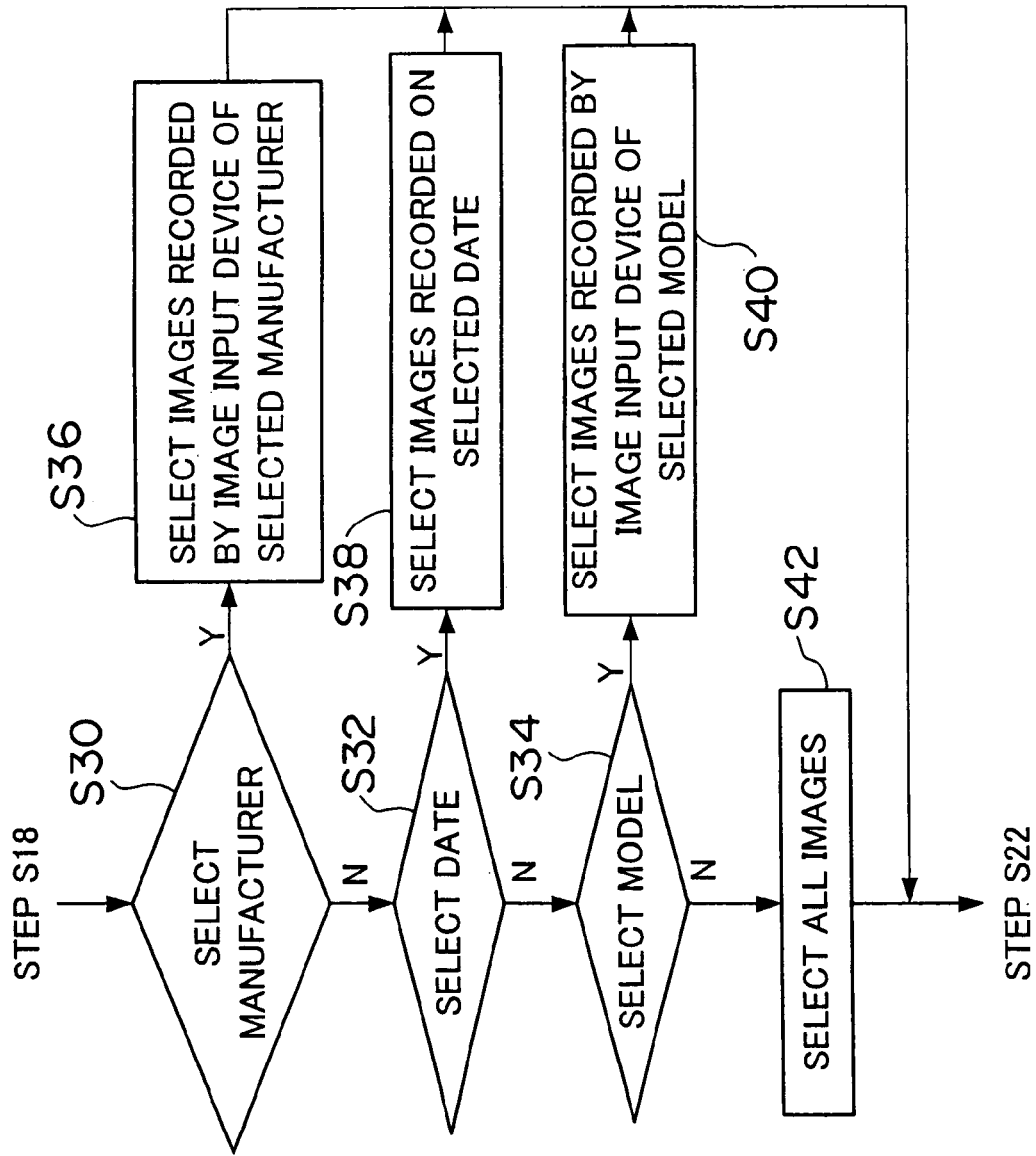
FIG. 5 is a flow chart showing another embodiment of selection of images to be transmitted.

FIG. 5 is a flow chart showing another embodiment of the selection of images to be transmitted.

After the power supply of each part is turned on (step S18 in FIG. 4), it is determined whether the manufacturer of the image input device such as the digital camera has been selected (step S30), whether the photographing date or the image file creation date has been selected (step S32), and whether the model of the image input device has been selected (step S34).

Upon selection of the manufacturer of the image input device, the image control part 11 selects the image file(s) that is recorded by the image input device of the selected manufacturer, according to the manufacturer identification code in the annexed information of the image file(s) (step S36). Upon selection of the date, the image control part 11 selects the image file(s) that is recorded on the selected date, according to the date identification code in the annexed information of the image file(s) (step S38). Upon selection of the model, the image control part 11 selects the image file(s) that is recorded by the image input device of the selected model, according to the model identification code in the annexed information of the image file(s) (step S40).

This enables the efficient selection of the image files. If none of the above selections is performed, all the images recorded in the memory card are selected (step S42).

The information for selecting the desired image or images to be transmitted from the images recorded in the memory card 2 is not restricted to the above embodiment. For example, it is possible to use GPS information in the annexed information to thereby select images that are captured at substantially the same photographing place. It is also possible to select images to be transmitted on condition that two or more pieces of selecting information are satisfied among multiple pieces of selecting information about the manufacturer, the date, the model and the like.

Figure 6:
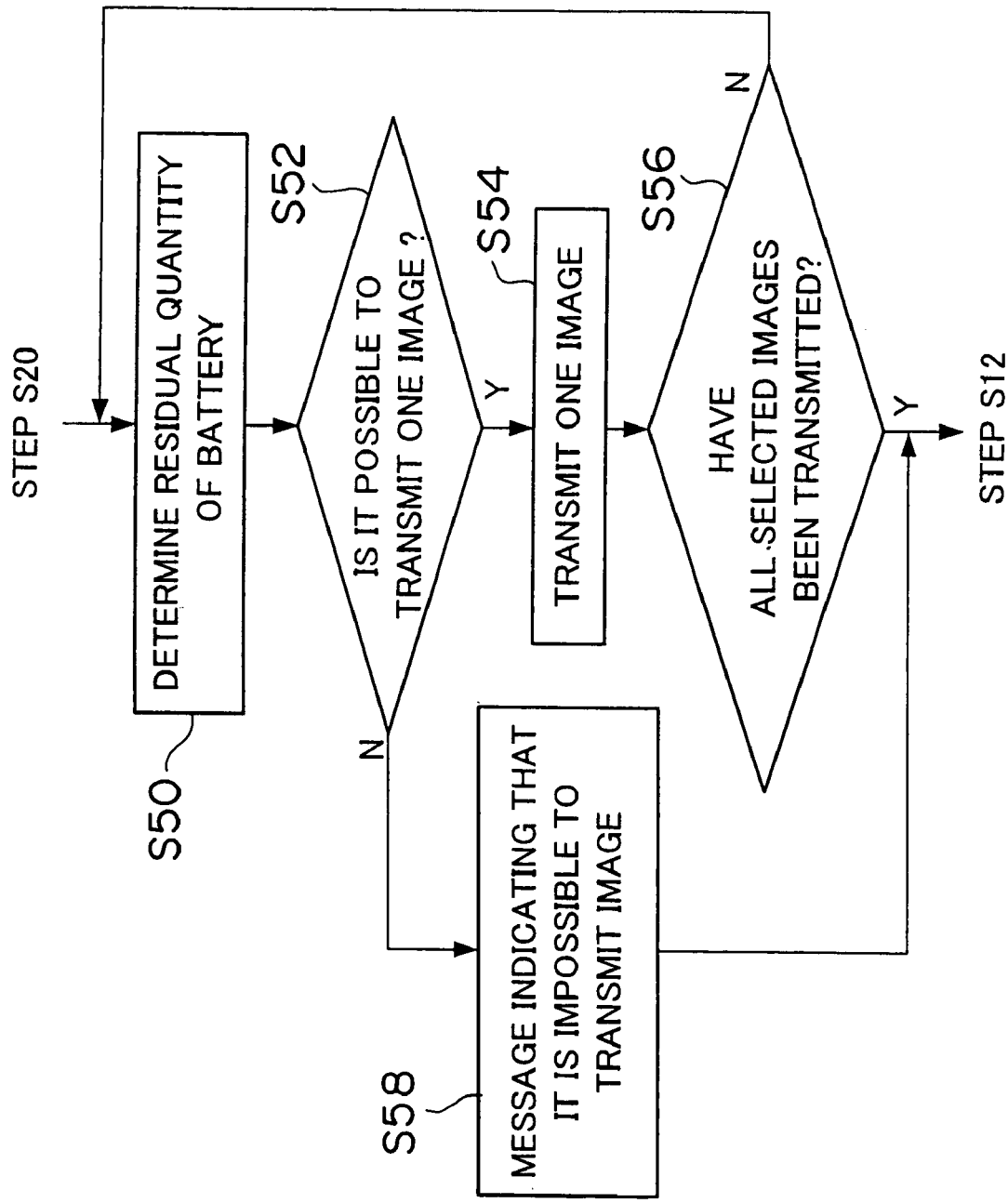
FIG. 6 is a flow chart showing another embodiment of determination about whether or not it is possible to transmit images.

FIG. 6 is a flow chart showing another embodiment of the determination about whether it is possible or not to transmit the images.

After the images to be transmitted are selected (step S20 in FIG. 4), the battery is checked to determine the residual quantity of the battery as shown in FIG. 6 (step S50). According to the residual quantity of the battery determined in the step S50, it is determined whether it is possible or not to transmit image data of one image (step S52).

If it is determined in the step S52 that it is possible to transmit the image data of one image, the image data of one untransmitted image among the selected images is transmitted (step S54). Then, it is determined whether all the selected images have been transmitted or not (step S56). If all the selected images have already been transmitted, the process jumps to the step S12. If all the selected images have not yet been transmitted, the process jumps to the step S50 in order to check the battery again.

If it is determined in the step S52 that it is impossible to transmit the image data of one image according to a result of the battery checking in the step S50, a message indicating that it is impossible to transmit the image is displayed on the LCD part 12 in order to prohibit the transmission of the image data (step S58). Then, the process jumps to the step S12.

According to the embodiment shown in FIG. 6, the battery is checked for every piece of image data of one image to determine whether it is possible or not to transmit the image data of the one image. This solves the problem that the transmission of the image data of one image is interrupted if the battery should go dead.

In the step S58, the message indicating that it is impossible to transmit the image is displayed, and it is preferable to additionally display the file, etc. of the image that is selected to be transmitted but is prohibited from being transmitted. It is also possible to store the name of the file of the image that is prohibited from being transmitted, in a non-volatile memory such as EEPROM, and automatically transmit the image data of the prohibited image when the battery is replaced with a new one.

FIG. 7 is a flow chart showing yet another embodiment of the determination about whether it is possible or not to transmit the image.

After the residual quantity of the battery is determined (step S22 in FIG. 4), it is determined whether it is possible or not to transmit main image data of all the selected images according to the residual quantity of the battery determined in the step S22 as shown in FIG. 6 (step S60). If it is determined in the step S60 that it is possible to transmit the main image data of all the selected images, the main image data of all the selected images is transmitted (step S62). Then, the process jumps to the step S12.

If it is determined in the step S60 that it is impossible to transmit the main image data of all the selected images, it is then determined that it is possible or not to transmit thumbnail image data of all the selected images (step S64). If it is determined in the step S64 that it is possible to transmit the thumbnail image data of all the selected images, a message indicating that the thumbnail image data will be transmitted is displayed on the LCD part 12 (step S66). Then, the thumbnail image data of all the selected images is transmitted (step S68), and the process jumps to the step S12.

If it is determined in the step S64 that it is impossible to transmit the thumbnail image data of all the selected images, a message indicating that it is impossible to transmit the images is displayed on the LCD part 12, and the transmission of the image data is prohibited (step S70). Then, the process jumps to the step S12.

More specifically, if it is determined that it is impossible to transmit the main image data as a result of checking the battery, the thumbnail image data with a smaller data amount is transmitted. If it is impossible to transmit even the thumbnail image data, the transmission of the image data is prohibited.

Regardless of the embodiment described with reference to FIG. 7, it is possible to sequentially reduce the data amount of "the main image data and the thumbnail image data", "the main image data", "the thumbnail image data" and "the annexed information" in that order for example according to the residual quantity of the battery and then transmit the transmittable data.

According to the present invention as set forth hereinabove, the transmission of the image data is prohibited from starting if it is determined that it is impossible to all of the image data according to the amount of the image data to be transmitted and the battery residual quantity. This eliminates the disadvantage that the transmission of the image data is interrupted because the battery goes dead in the middle of the transmission. Moreover, the images to be transmitted are selected according to the input of the identification code, and this enables the easy selection of related images.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image transmitter which transmits image data, the image transmitter comprising:
   a display device which displays a multi-image composed of a plurality of thumbnail images;
   an image selecting device which selects a subset of images to be transmitted from a plurality of images corresponding to the plurality of thumbnail images;

a data amount determining device which determines an amount of data in the subset of images;

a battery residual quantity determining device which determines a residual quantity of a battery powering the image transmitter;

a transmittability determining device which determines whether or not it is possible to transmit all of image data of the subset of images according to the amount of data in the subset of images and the residual quantity of the battery; and a control device which transmits the subset of images if the transmittability determination device determines that it is possible to transmit all of image data, and which prohibits the image data from being transmitted if the transmittability determination device determines that it is impossible to transmit all of image data.

2. The image transmitter according to claim 1, further comprising a display device which displays a message indicating that it is impossible to transmit all of the image data if the control device prohibits the image data from being transmitted.

3. The image transmitter of claim 1, wherein the image selecting device select the subset of images based on the multi-image displayed on the display device.

4. An image transmitter which transmits image data, the image transmitter comprising:

an image selecting device which selects at least one image to be transmitted;

a data amount determining device which determines an amount of data in the selected image;

a battery residual quantity determining device which determines a residual quantity of a battery powering the image transmitter;

a transmittability determining device which determines whether or not it is possible to transmit all of image data of the selected image according to the amount of data in the selected image and the residual quantity of the battery; and a control device which transmits the image if the transmittability determination device determines that it is possible to transmit all of image data, and which prohibits the image data from being transmitted if the transmittability determination device determines that it is impossible to transmit all of image data, wherein the image data comprises an identification code and the image selecting device selects the image to be transmitted according to input of the identification code.

5. The image transmitter according to claim 4, wherein the identification code comprises at least one of the following: a manufacture identification code representing a manufacturer of an image input device capturing the image, a date identification code representing one of a photographing date and an image file creation date of the image, and a model identification code representing a model of the input image device.

6. An image transmitter which transmits image data, the image transmitter comprising:

an image selecting device which selects at least one image to be transmitted;

a data amount determining device which determines an amount of data in the selected image;

a battery residual quantity determining device which determines a residual quantity of a battery powering the image transmitter;

a transmittability determining device which determines whether or not it is possible to transmit all of image data of the selected image according to the amount of data in the selected image and the residual quantity of the battery; and a control device which transmits the image if the transmittability determination device determines that it is possible to transmit all of image data, and which prohibits the image data from being transmitted if the transmittability determination device determines that it is impossible to transmit all of image data, wherein when a plurality of images are selected to be transmitted, if it is determined that it is impossible to transmit all of the image data, the control device transmits only transmittable image data per image and prohibits the rest of image data from being transmitted.

7. An image transmitter which transmits image data, the image transmitter comprising:

an image selecting device which selects at least one image to be transmitted;

a data amount determining device which determines an amount of data in the selected image;

a battery residual quantity determining device which determines a residual quantity of a battery powering the image transmitter;

a transmittability determining device which determines whether or not it is possible to transmit all of image data of the selected image according to the amount of data in the selected image and the residual quantity of the battery; and a control device which transmits the image if the transmittability determination device determines that it is possible to transmit all of image data, and which prohibits the image data from being transmitted if the transmittability determination device determines that it is impossible to transmit all of image data, wherein the image data comprises main image data and thumbnail image data;

wherein if the determination device determines that it is impossible to transmit all of the main image data, the determination device further determines whether it is possible to transmit all of the thumbnail image data; and wherein if the determination device determines that it is impossible to transmit all of the main image data and that it is possible to transmit all of the thumbnail image data, the control device transmits the thumbnail image data instead of the main image data.

8. An image transmitter, comprising:

an image selecting device configured to select one or more images to be transmitted;

a data amount determining device configured to determine an amount of data related to the selected images, wherein image data for each image comprises a plurality of data components;

a battery residual quantity determining device configured to determine a residual quantity of a battery powering the image transmitter;

a transmittability determining device configured to determine whether or not at least some data of the selected images may be transmitted based on the residual quantity of the battery; and a control device configured to transmit the at least some data in response to said transmittability determination device determining that the at least some data may be transmitted.

9. The image transmitting device of claim 8, wherein the plurality of data components for each image includes a main image data and at least one of an annexed information and a thumbnail image data.

10. The image transmitting device of claim 9, wherein the annexed information includes at least one of a manufacturer of an image input device used to capture the image, a model of the image input device, a location information, a photographing date, a file creation date, and an amount of data.

11. The image transmitting device of claim 10, wherein said image selecting device is configured to select the one or more images according to an identification code corresponding to the annexed information inputted to the image selecting device.

12. The image transmitting device of claim 9,
wherein said transmittability device is configured to determine whether the main image data of all selected images may be transmitted, and
wherein said control device is configured to transmit the main image data of all selected images in response to said transmittability determination device determining that the main image data of all selected images may be transmitted.

13. The image transmitting device of claim 12,
wherein said transmittability device is configured to determine whether the thumbnail image data of all selected images may be transmitted when it determines that the main image data of all selected images may not be transmitted, and
wherein said control device is configured to transmit the thumbnail image data of all selected images in response to said transmittability determination device determining that the thumbnail image data of all selected images may be transmitted.

14. The image transmitting device of claim 13,
wherein said transmittability device is configured to determine whether the annexed information of all selected images may be transmitted when it determines that the thumbnail image data of all selected images may not be transmitted, and
wherein said control device is configured to transmit the annexed information of all selected images in response to said transmittability determination device determining that the annexed information of all selected images may be transmitted.

15. The image transmitting device of claim 12,
wherein said transmittability device is configured to determine whether the main image data and the thumbnail image data of all selected images may be transmitted prior to determining whether the main image data of all selected images may be transmitted, and
wherein said control device is configured to transmit the main image data and the thumbnail image data of all selected images in response to said transmittability determination device determining that the main image data and the thumbnail image data of all selected images may be transmitted.

16. The image transmitting device of claim 9,
wherein for a selected image, said transmittability device is configured to determine whether the main image data of the selected image may be transmitted, and
wherein said control device is configured to transmit the main image data of the selected image in response to said transmittability determination device determining that the main image data of the selected image may be transmitted.

17. The image transmitting device of claim 16, wherein said control device is configured to prohibit any further transmission in response to said transmittability determination device determining that the main image data of the selected image may not be transmitted.

18. The image transmitting device of claim 16,
wherein said transmittability device is configured to determine whether the main image data of a next selected image in response said control device transmitting the main image data of the selected image, and
wherein said control device is configured to transmit the main image data of the next selected image in response to said transmittability determination device determining that the main image data of the next selected image may be transmitted.

19. The image transmitting device of claim 16,
wherein said transmittability device is configured to determine whether the main image data and the thumbnail image data of the selected image may be transmitted prior to determining whether the main image data of the selected image may be transmitted, and
wherein said control device is configured to transmit the main image data and the thumbnail image data of the selected image in response to said transmittability determination device determining that the main image data and the thumbnail image data of the selected image may be transmitted.

20. The image transmitting device of claim 16,
wherein said transmittability device is configured to determine whether the thumbnail image data of the selected image may be transmitted when it determines that the main image data of the selected image may not be transmitted, and
wherein said control device is configured to transmit the thumbnail image data of the selected image in response to said transmittability determination device determining that the thumbnail image data of the selected image may be transmitted.

21. The image transmitting device of claim 20,
wherein said transmittability device is configured to determine whether the annexed information of the selected image may be transmitted when it determines that the thumbnail image data of the selected image may not be transmitted, and
wherein said control device is configured to transmit the annexed information of the selected image in response to said transmittability determination device determining that the annexed information of the selected image may be transmitted.

22. An image transmitting method, comprising:
selecting one or more images to be transmitted;
determining an amount of data related to the selected images, wherein image data for each image comprises a plurality of data components;
determining a residual quantity of a battery powering the image transmitter;
determining whether or not at least some data of the selected images may be transmitted based on the residual quantity of the battery; and
transmitting the at least some data in response to the determination that the at least some data may be transmitted.

23. The image transmitting method of claim 22, wherein the plurality of data components for each image includes a main image data and at least one of an annexed information and a thumbnail image data.

24. The image transmitting method of claim 23, wherein the annexed information includes at least one of a manufacturer of an image input device used to capture the image, a model of the image input device, a location information, a photographing date, a file creation date, and an amount of data.

25. The image transmitting method of claim 24, wherein said step of selecting the one or more images comprises:
receiving an identification code corresponding to the annexed information; and
selecting the one or more images according to the identification code.

26. The image transmitting method of claim 23,
wherein said step of determining whether or not the at least some data of the selected images may be transmitted comprises determining whether the main image data of all selected images may be transmitted, and
wherein said step of transmitting the at least some data comprises transmitting the main image data of all selected images in response to a determination that the main image data of all selected images may be transmitted.

27. The image transmitting method of claim 26,
wherein said step of determining whether or not the at least some data of the selected images may be transmitted further comprises determining whether the main image data and the thumbnail image data of all selected images may be transmitted prior to determining whether the main image data of all selected images may be transmitted, and
wherein said step of transmitting the at least some data further comprises transmitting the main image data and the thumbnail image data of all selected images in response to a determination that the main image data and the thumbnail image data of all selected images may be transmitted.

28. The image transmitting method of claim 26,
wherein said step of determining whether or not the at least some data of the selected images may be transmitted further comprises determining whether the thumbnail image data of all selected images may be transmitted in response to a determination that the main image data of all selected images may not be transmitted, and
wherein said step of transmitting the at least some data further comprises transmitting the thumbnail image data of all selected images in response to a determination that the thumbnail image data of all selected images may be transmitted.

29. The image transmitting method of claim 28,
wherein said step of determining whether or not the at least some data of the selected images may be transmitted further comprises determining whether the annexed information of all selected images may be transmitted in response to a determination that the thumbnail image data of all selected images may not be transmitted, and
wherein said step of transmitting the at least some data further comprises transmitting the annexed information of all selected images in response to a determination that the annexed information of all selected images may be transmitted.

30. The image transmitting method of claim 23,
wherein said step of determining whether or not the at least some data of the selected images may be transmitted comprises determining whether the main image data of a selected image may be transmitted, and
wherein said step of transmitting the at least some data comprises transmitting the main image data of the selected image in response to a determination that the main image data of the selected image may be transmitted.

31. The image transmitting method of claim 30, further comprising prohibiting any further transmission in response a determination that the main image data of the selected image may not be transmitted.

32. The image transmitting method of claim 30,
wherein said step of determining whether or not the at least some data of the selected images may be transmitted further comprises determining whether the thumbnail image data of the selected image may be transmitted in response to a determination that the main image data of the selected image may not be transmitted, and
wherein said step of transmitting the at least some data further comprises transmitting the thumbnail image data of the selected image in response to a determination that that the thumbnail image data of the selected image may be transmitted.

33. The image transmitting method of claim 32,
wherein said step of determining whether or not the at least some data of the selected images may be transmitted further comprises determining whether the annexed information of the selected image may be transmitted in response to a determination that the thumbnail image data of the selected image may not be transmitted, and
wherein said step of transmitting the at least some data further comprises transmitting the annexed information of the selected image in response to a determination that the annexed information of the selected image may be transmitted.

34. The image transmitting method of claim 30,
wherein said step of determining whether or not the at least some data of the selected images may be transmitted further comprises determining whether the main image data of a next selected image may be transmitted in response the determination that the selected image may be transmitted, and
wherein said step of transmitting the at least some data further comprises transmitting the main image data of the next selected image in response to a determination that the main image data of the next selected image may be transmitted.

35. The image transmitting method of claim 30,
wherein said step of determining whether or not the at least some data of the selected images may be transmitted further comprises determining whether the main image data and the thumbnail image data of the selected image may be transmitted prior to determining whether the main image data of the selected image may be transmitted, and
wherein said step of transmitting the at least some data further comprises transmitting the main image data and the thumbnail image data of the selected image in response to a determination that the main image data and the thumbnail image data of the selected image may be transmitted.

* * * * *